April 16, 1963  D. J. MacGREGOR  3,086,155
SYNCHRONOUS MOTOR CONTROL SYSTEM
Filed March 11, 1960
Fig. 1.
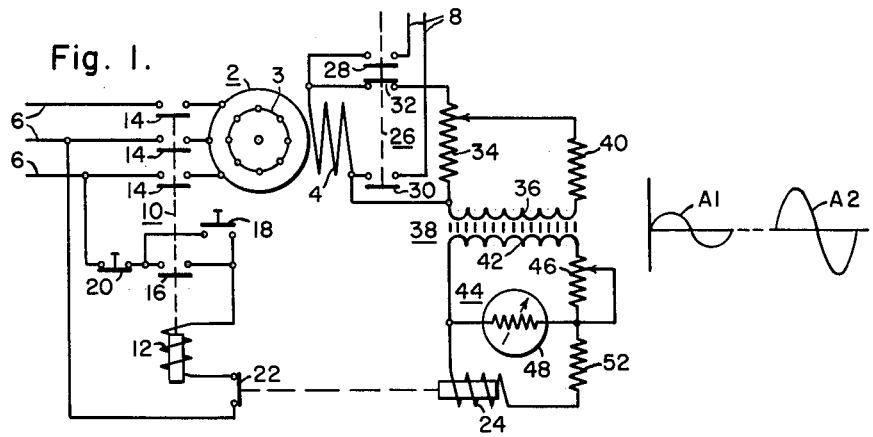
Fig. 2.
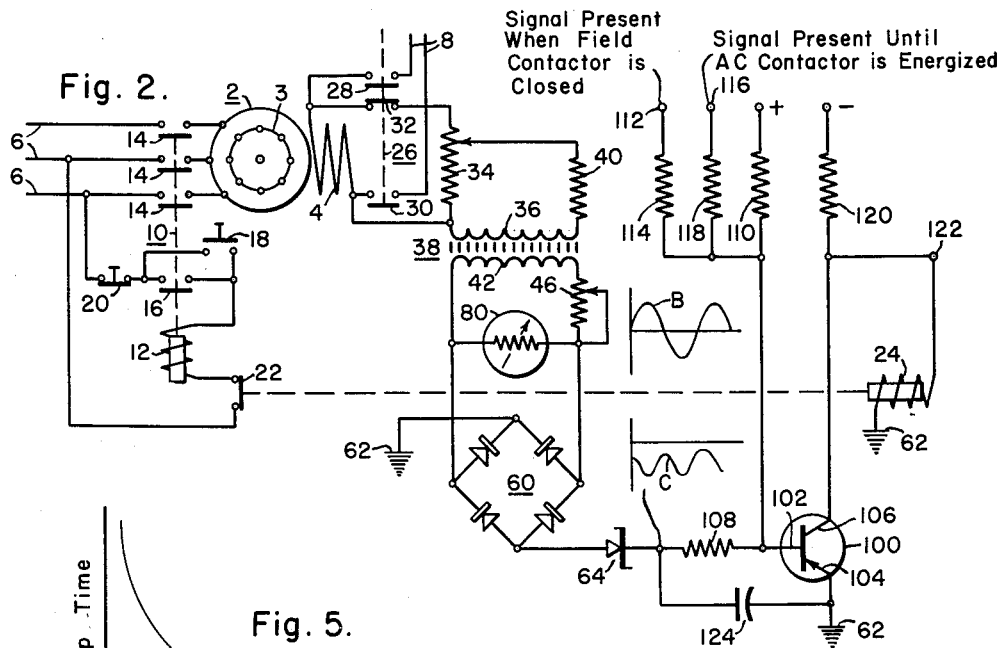
Signal Present When Field Contactor is Closed
Signal Present Until AC Contactor is Energized
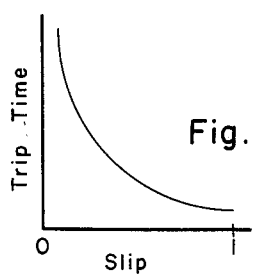
Fig. 5.
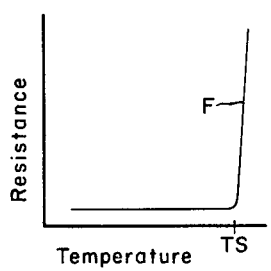
Fig. 3.
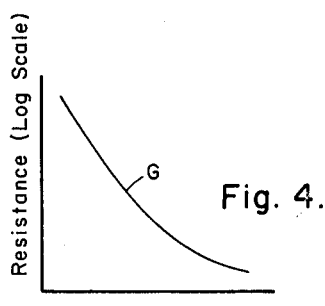
Fig. 4.

United States Patent Office

3,086,155
Patented Apr. 16, 1963

3,086,155
SYNCHRONOUS MOTOR CONTROL SYSTEM
Dean J. MacGregor, Amherst, N.Y., assignor to Westinghouse Electric Corporation, East Pittsburgh, Pa., a corporation of Pennsylvania
Filed Mar. 11, 1960, Ser. No. 14,398
14 Claims. (Cl. 318—170)

The present invention relates to synchronous motor control systems and more particularly to a static damper winding protection circuit for a synchronous alternating current motor.

Conventional damper winding protection circuits consist of a thermal relay actuated by a transformer energized from a motor field winding. The transformer imparts frequency sensitive characteristics to the relay. The relay has moving parts which frequently corrode, making it inoperative. The relay is subject to malfunctions due to vibrations, shock or contaminated atmospheres. The parts must be manufactured to close tolerances and carefully adjusted if the relay is to operate at all properly. Thus, the conventional damper winding protection circuit has disadvantages both in its manufacture and application.

The object of this invention is to provide a damper winding protection scheme for a synchronous motor, utilizing static components requiring little or no maintenance.

Another object of this invention is to provide a damper winding protection scheme for a synchronous motor control system which will be compact, light in weight, and reliable.

Another object of the present invention is to provide a static damper winding protection circuit for a synchronous motor control system which is extremely simple and inexpensive.

Further objects and advantages of the invention will be readily apparent from the following detailed description taken in conjunction with the drawing, in which:

FIG. 1 is a schematic diagram of an illustrative embodiment of the invention with the waveforms at progressive stages indicated thereon;

FIG. 2 is a schematic diagram of another illustrative embodiment of the invention with the waveforms at progressive stages indicated thereon;

FIG. 3 is a graphical representation illustrating a characteristic curve of a device used in the circuit shown in FIG. 1;

FIG. 4 is a graphical representation illustrating a characteristic curve of a device used in the circuit shown in FIG. 2; and FIG. 5 is a graphical representation of a characteristic obtainable by the present invention.

The invention is shown embodied in an electrical control system for a synchronous motor 2 having a damper winding 3 and a field winding 4. The alternating current power supply is indicated by the power supply lines 6 while the direct current excitation supply is represented by the leads 8. The main contactor 10, having an operating coil 12 and main contacts 14, as well as an auxiliary contact 16, is energized to its closed position by depressing a start button 18. The start push button 18 is in series connection with a stop push button 20 along with the operating coil 12 and a normally closed contact 22 across the power supply lines 6. The normally closed contact 22 will be referred to as the damper protection relay contact having an operating coil 24. Its purpose will be more fully described hereinafter.

During start-up, the motor will accelerate to a proper speed for synchronization whereupon the field contactor 26 will be energized by appropriate means closing its normally open contacts 28 and 30 while opening its normally closed contact 32. During start-up, a field discharge resistor 34 is connected across a field winding 4 by means of the normally closed contact 32. During the interval between initial starting of the motor and the attainment of the proper speed for synchronization, the damper winding protection circuit, which is the substance of this invention, functions in the synchronous motor control system.

The first illustrative embodiment of the invention is shown in FIG. 1. The voltage which is induced in the field winding 4 during start-up is applied to the primary winding 36 of a saturating transformer 38 in series with a resistor 40. The alternating voltage induced in the field winding 4 has a frequency which is equivalent to the slip frequency of the machine and will hereinafter be referred to as the slip frequency. This voltage remains essentially constant during most of the starting period. Since the transformer 38 will draw increased exciting current as the frequency decreases, the voltage across the primary winding 36 decreases because of the voltage dividing action of resistor 40; and, therefore, the voltage on the secondary winding 42 of the transformer 38 will also decrease with frequency.

A load circuit 44 is connected across the secondary winding 42. The load circuit comprises a variable resistor 46 in electrical series connection with a positive temperature coefficient thermistor 48. The secondary voltage across the load circuit 44 divides proportionally to the impedance of the variable resistor 46 and thermistor 48.

It is to be understood that the positive temperature coefficient thermistor 48 is a non-linear device which has a characteristic of markedly changing its resistance value upon occurrence of a predetermined temperature within the thermistor. Current flow through the load circuit 44 will have a magnitude determined by the series resistance of the variable resistor 46 and thermistor 48. The thermistor integrates the instantaneous rates of heating of the damper winding thereby simulating the total temperature of the damper winding. Upon the thermistor attaining a predetermined temperature, determined by integrating the instantaneous rates of heating, the thermistor will alter its resistance sufficiently to be detected. The detection results in an output signal capable of deenergizing the synchronous motor before any thermal damage is done to the damper windings.

Referring to FIG. 3, it can be seen from the characteristic curve, F, that the resistance of the positive temperature coefficient thermistor 48 will increase markedly as the temperature of the thermistor reaches a predetermined level. When the positive temperature coefficient thermistor is heated sufficiently to reach its critical switching temperature TS, its resistance increases rapidly. The voltage across the thermistor also increases and serves as an output signal which can be utilized to shut down the motor 2 by energizing the damper protection contact operating coil 24.

The current through the thermistor 48 will be large when the motor is running at slow speeds, and will decrease as the motor speed increases and the slip frequency decreases. The voltage applied to the primary winding 36 of the transformer 38 is essentially constant until the motor accelerates to nearly synchronous speed.

The damper protection contact operating coil 24 is connected across the thermistor 48 through a current limiting resistor 52. The voltage across the coil 24 will have a form as indicated by the waveform A1 when the voltage across the thermistor 48 is relatively small due to the temperature within the thermistor being below the predetermined switching level. When the thermistor 48 is heated sufficiently to reach its critical switching temperature, its resistance increases and hence the voltage across the thermistor also increases to a magnitude sufficient to cause operation of the operating coil 24. See voltage waveform A2. The operating coil 24 opens the normally closed contact 22 thereby deenergizing the line contactor 10 and disconnecting the synchronous motor 2 from the power line 6.

The current through the thermistor 48 can be adjusted by varying the resistance value of the variable resistor 46. This resistance may be adjusted until the time delay with a line frequency input to the transformer 38 is slightly less than the safe-locked rotor time specified by the motor designer. When desirable, the primary coil 36 may be connected in series with the discharge resistor, but this has the disadvantage of requiring the winding 36 to carry the full induced field current.

FIG. 2 illustrates an alternate embodiment of the invention wherein like elements are indicated with the same reference characters as FIG. 1. In FIG. 2 a negative temperature coefficient thermistor 80 is utilized. The saturating transformer 38, variable resistor 46 and resistor 40 have the same functions as explained previously. Now, however, the negative temperature coefficient thermistor 80 will decrease in resistance as it is heated as shown by the characteristic curve G in FIG. 4. Thus, when the thermistor is "cold," the voltage across the thermistor will be high and the full wave rectified voltage will appear across the terminals of rectifying means 60. The positive output terminal of the rectifying means 60 is grounded at 62 while the negative output terminal is connected to a Zener diode 64. The opposite side of the Zener diode 64 is connected to a switching transistor 100. The breakdown level of the Zener diode 64 is selected to have a predetermined magnitude.

It will be understood that the Zener diode is a semiconductor rectifier, usually a silicon diode, which has the characteristic of blocking current flow in one direction when the voltage is below a predetermined breakdown value while current is permitted to flow freely when the voltage is above the predetermined value. The breakdown is nondestructive so that the current is cut off when the voltage again drops below the breakdown value. Of course, any device with a breakdown region as described can be used.

The switching transistor 100 comprises a base electrode 102, emitter electrode 104, and collector electrode 106. The base electrode 102 is connected to the Zener diode 64 through a current limiting impedance 108. The base electrode 102 is also connected to a positive biasing potential through the resistor 110. The base electrode 102 is connected to receive at terminal 112 through resistor 114 a negative potential signal which is present after the field contactor 26 has been closed during the synchronizing sequence to insure that false operation of the damper winding protection circuit will not result after synchronization of the motor. The base electrode 102 is also connected to receive a signal from the input terminal 116 through a resistor 118 which signal is also a negative input present only until the line contactor 10 is energized. In such a manner, the damper winding protection circuit will not give an erroneous output or hold the damper contact 22 open thereby blocking start-up of the machine. These two signals effectively limit the operation of the damper winding protection circuit to the interval when the motor is accelerating. The emitter electrode 104 is grounded at 62 while the collector electrode 106 is connected to a negative potential power supply through a resistor 120. The collector electrode 106 is also connected to an output terminal 122 with the operating coil 24 of the damper protection contact 22 connected thereto and to ground 62.

During start-up when the thermistor 80 is of low temperature, the voltage, B, across the thermistor is high and the full wave rectifier voltage output, C, across the output terminals of rectifying means 60 exceeds the breakdown voltage of the Zener diode 64. Current thus flows from the base electrode 102 causing the transistor 100 to be conductive, keeping the output terminal 122 at ground potential. A capacitor 124 connected between the Zener diode 64 and resistor 108 to ground 62 serves as a filter to prevent the negative signal C from decreasing sufficiently to allow transistor 100 to switch to the non-conducting state.

When the thermistor is self-heated sufficiently, the voltage across the thermistor 80 will decrease below the breakdown voltage of the Zener diode 64 thus allowing the positive bias through the resistor 110 to drive the transistor 100 into cutoff, and allowing an output signal to appear at the terminal 122. This signal may be used to energize relay 24 and disconnect the motor from the power supply as explained previously.

FIG. 5 illustrates a characteristic of the invention wherein increased trip time with decreasing slip frequency is obtained. This characteristic allows a longer starting time for a given synchronous motor than the allowable locked rotor time.

The present invention provides a damper winding protection circuit which is very simple and very inexpensive. The invention utilizes the frequency sensitive characteristics of a saturating current transformer which has been used in the conventional damper winding protection circuits and has proven satisfactory. The damper winding protection scheme is compact, light in weight, and reliable through the use of static devices requiring little or no maintenance.

Various modifications are possible within the spirit and scope of the present invention. While a PNP transistor has been indicated in FIG. 2, it is to be understood that an NPN transistor may be used with appropriate changes in polarity. Static control means capable of interrupting and switching similarly to the normally closed contact 22 may be employed when desirable or suitable. These alterations and substitutions are merely by way of example. Although particular embodiments of the invention have been shown for purposes of illustration, it is to be understood that the invention is not limited to the specific arrangement shown, but includes all equivalent embodiments, modifications, and substitutions within the spirit and scope of the invention.

I claim as my invention:

1. A damper winding protection circuit for a synchronous alternating current motor having a field winding comprising; saturating transformer means having input means and output means, said field winding connected to said input means, said output means responsive to the frequency of the induced alternating voltage in the field winding for providing an output voltage, non-linear impedance means operably connected in circuit with said output means to draw current non-linearly from said output means, said impedance means having an impedance functionally related to the integration of the output voltage with respect to time, and means responsive to a predetermined level of impedance for deenergizing said synchronous motor.

2. A damper winding protection circuit for a synchronous alternating current motor having a field winding comprising; saturating transformer means having input means and output means, said field winding connected to said input means, said output means having an output voltage responsive to the frequency of the induced alternating voltage in the field winding, non-linear impedance means connected in circuit with said output means to draw current non-linearly from said output means, said impedance means having an impedance functionally related to the integration of the output voltage with respect to time, means responsive to a predetermined level of impedance for deenergizing said synchronous motor, and means for adjusting the magnitude of said output voltage for a predetermined frequency of the induced alternating voltage.

3. A damper winding protection circuit for a synchronous alternating current motor having a field winding and a damper winding comprising; saturating transformer means having input means and output means, said field winding connected to said input means, said output means having an output voltage responsive to the frequency of the induced alternating voltage in the field winding, thermistor means connected to said output means, said thermistor means having thermocharacteristics similar to said damper winding for integrating the instantaneous rates of heating of the damper winding and simulating the total temperature of the damper winding for providing an output signal upon said integral exceeding a predetermined magnitude, and means for deenergizing said motor in response to said output signal.

4. A damper winding protection circuit for a synchronous alternating current motor having a field winding comprising; saturating transformer means having input means and output means, said field winding connected to said input means, said output means having an output voltage responsive to the frequency of the induced alternating voltage in the field winding, a positive temperature coefficient thermistor connected to be energized by said output means, said positive temperature coefficient thermistor storing said energy and having a substantial increase in resistance upon said energy totaling more than a predetermined level, and means connected to said thermistor responsive to said substantial increase in resistance for deenergizing said motor.

5. A damper winding protection circuit for a synchronous alternating current motor having a field winding comprising; saturating transformer means having input means and output means, said field winding connected to said input means, said output means having an output voltage responsive to the frequency of the induced alternating voltage in the field winding, an output circuit connected to said output means, said output circuit comprising a resistance element serially connected with a positive temperature coefficient thermistor, said thermistor having a resistance which is a function of the ampere-seconds through said thermistor and which increases substantially when said ampere-seconds exceeds a predetermined level, and means responsive to that part of the output voltage across the thermistor for deenergizing said motor when said part exceeds a predetermined level.

6. A damper winding protection circuit for a synchronous alternating current motor having a field winding comprising; saturating transformer means having input means and output means, said field winding connected to said input means, said output means having an output voltage responsive to the frequency of the induced alternating voltage in the field winding, an output circuit connected to said output means, said output circuit comprising a variable impedance connected in series circuit relationship with a positive temperature coefficient thermistor, said thermistor having a resistance which is a function of the ampere-seconds through said thermistor and which increases substantially when said ampere-seconds exceeds a predetermined level, and means responsive to that part of the output voltage across the thermistor for deenergizing said motor when said part exceeds a predetermined level.

7. A damper winding protection circuit for a synchronous alternating current motor having a field winding comprising; saturating transformer means having input means and output means, said field winding connected to said input means, said output means having an output voltage responsive to the frequency of the induced alternating voltage in the field winding, an output circuit connected to said output means, said output circuit comprising a resistance element serially connected with a negative temperature coefficient thermistor, that part of the output voltage across said thermistor being functionally related to the integration of the current through said thermistor with respect to time, semiconductor diode means connected to said thermistor and having a predetermined breakdown potential, the voltage across said diode means exceeding said breakdown potential when that part of the output voltage across said thermistor exceeds a predetermined level, and means operably connected to said semiconductor diode means and responsive to the voltage across said diode means for deenergizing said motor when the voltage across said diode means is less than said predetermined breakdown potential level.

8. A damper winding protection circuit for a synchronous alternating current motor having a field winding comprising; saturating transformer means having input means and output means, said field winding connected to said input means, said output means having an output voltage responsive to the frequency of the induced alternating voltage in the field winding, an output circuit connected to said output means, said output circuit comprising a variable impedance connected in series circuit relationship with thermistor means having a negative temperature coefficient, that part of the output voltage across said thermistor being functionally related to the integration of the current through said thermistor with respect to time, rectifying means connected across said thermistor for providing a rectified voltage proportional to the voltage across the thermistor, transistor means, and semiconductor diode means connecting said transistor means to said rectifying means and having a predetermined breakdown potential, said semiconductor diode means poled to block current flow between the transistor means and rectifying means when said rectified voltage is less than said predetermined breakdown potential, said transistor means responsive to the blocking of current flow between said thermistor means and said rectifying means for deenergizing the motor.

9. A winding protection circuit for a synchronous dynamoelectric machine having a field winding comprising; first means operably connected to said field winding for providing a signal responsive to the frequency of the induced voltage in said field winding; non-linear impedance means connected in circuit with said first means whereby the impedance means draws current non-linearly from said first means, said impedance means being responsive to the integral of said signal with respect to time for providing a magnitude of impedance; and means responsive to a predetermined magnitude of impedance for providing an output signal.

10. A damper winding protection circuit for a synchronous dynamoelectric machine having a field winding and a damper winding comprising, in combination; means operably connected to said field winding for providing a signal responsive to the frequency of the induced voltage in said field winding; thermistor means responsive to said signal and having thermal characteristics substantially identical to said damper winding for integrating said signal with respect to time and simulating the total temperature of said damper winding and providing an output signal upon said integral exceeding a predetermined magnitude corresponding to the safe operating temperature limit of said damper winding; and means for deenergizing said motor in response to said output signal.

11. A damper winding protection circuit for a synchronous alternating current dynamoelectric machine having a field comprising, in combination; saturating means having an output voltage responsive to the frequency of the induced voltage in said field winding; a positive temperature coefficient thermistor connected to be energized by said output voltage; said positive temperature coefficient thermistor storing said energy and having a substantial increase in resistance upon said energy totaling more than a predetermined level; and means operably connected to said thermistor responsive to said substantial increase in resistance for providing an output signal.

12. A winding protection circuit for a synchronous alternating current machine having a field winding comprising saturating transformer means having input means and output means, said field winding connected to said input means, said output means having an output signal responsive to the frequency of the induced alternating voltage in the field winding, thermistor means connected to said output means and responsive to said signal for integrating said signal with respect to time and providing an output signal upon said integral exceeding a predetermined magnitude, and means for deenergizing said machine in response to said output signal.

13. A winding protection circuit for a synchronous dynamoelectric machine having a field winding comprising, in combination: means operably connected to said field winding for providing a signal responsive to the frequency of the induced voltage in said field winding; thermistor means responsive to said signal for integrating said signal with respect to time and providing an output signal upon said integral exceeding a predetermined magnitude; and means for deenergizing said motor in response to said output signal.

14. A winding protection circuit for a synchronous alternating current, dynamoelectric machine having a field winding comprising saturating transformer means having input means and output means, said field winding connected to said input means, said output means responsive to the frequency of the induced alternating voltage in the field winding for providing an output voltage, nonlinear impedance means operably connected in circuit with said output means to draw current non-linearly from said output means, said impedance means having an impedance functionally related to the integration of the output voltage with respect to time, and means responsive to a predetermined level of impedance for deenergizing said synchronous machine.

References Cited in the file of this patent
UNITED STATES PATENTS

| | | |
|---|---|---|
| 2,304,542 | Chambers | Dec. 8, 1942 |
| 2,428,539 | Armstrong | Oct. 7, 1947 |